March 17, 1936.   J. BUGATTI   2,034,504
SUSPENSION OF RAILWAY CARS AND OTHER VEHICLES
Filed June 7, 1934     2 Sheets-Sheet 1
Fig: 1
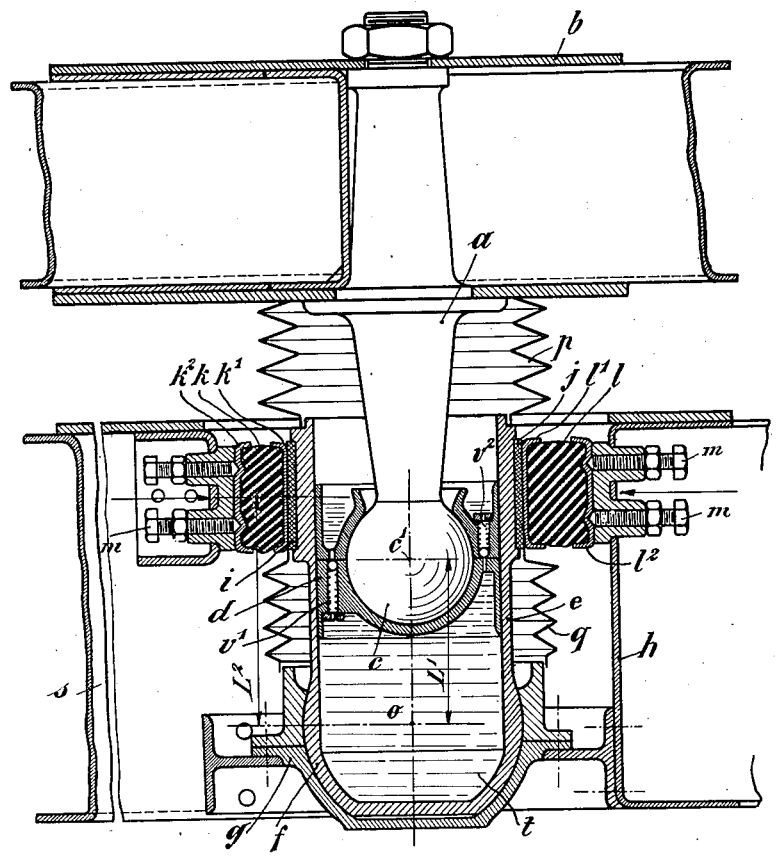
Fig: 3
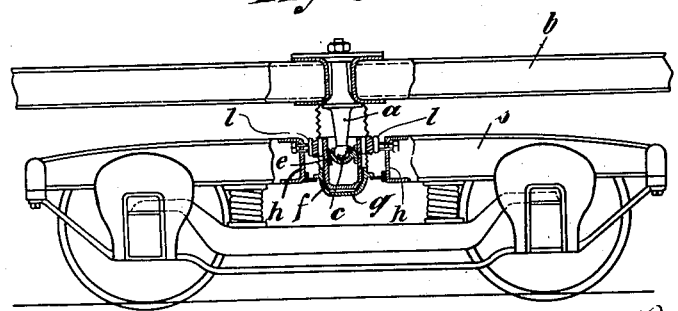
Inventor
Jean Bugatti
By Mauro & Lewis
Attorneys March 17, 1936. J. BUGATTI 2,034,504
SUSPENSION OF RAILWAY CARS AND OTHER VEHICLES
Filed June 7, 1934 2 Sheets-Sheet 2
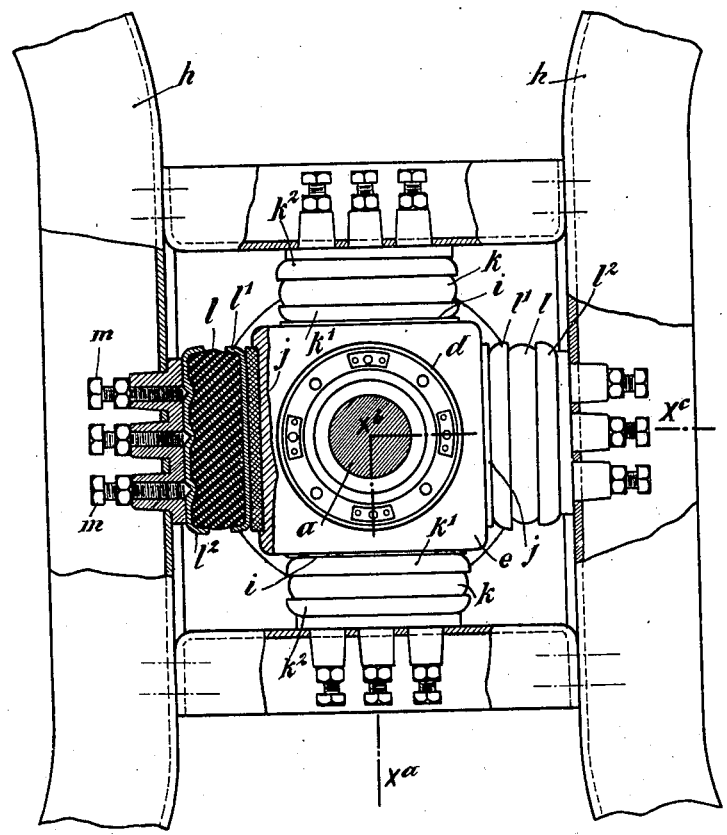

Patented Mar. 17, 1936

2,034,504

UNITED STATES PATENT OFFICE 2,034,504

SUSPENSION OF RAILWAY CARS AND OTHER VEHICLES

Jean Bugatti, Molsheim, France

Application June 7, 1934, Serial No. 729,503
In France June 12, 1933

6 Claims. (Cl. 105—193)

In my prior U. S. Patent application Ser. No. 646,191, filed Dec. 7, 1932 I described a suspension device for railway cars adapted to ensure the braking and the absorption of the relative displacements of the body and of the axles or trucks in the transverse direction and eventually in the vertical direction.

This device essentially included a cylinder or tube positively connected to the axle or truck in the longitudinal direction but capable of moving transversely to said direction against the action of suitable braking means and a kingbolt rigid with the body of the car and universally jointed with said cylinder or tube. Eventually, the vertical relative displacements of the kingbolt and of the cylinder or tube were braked by means of a dash-pot or equivalent hydraulic shock absorber.

The object of the present invention is to provide improvements to suspension devices of the type above referred to.

According to the present invention, the cylinder or tube with respect to which the kingbolt rigid with the body or suspended part can swivel and slide is itself universally jointed with the axle or truck; and the displacements of this cylinder or tube with respect to said axle or truck as well in the longitudinal direction (direction in which the vehicle is running) as in the transverse direction are absorbed by means of rubber blocks, springs, or other elastic devices suitably arranged for urging said cylinder or tube toward the vertical position.

According to another feature of the present invention, the universal means for connecting the cylinder or tube with the unsuspended part (axle or truck) are provided at the lower end of said cylinder or tube, in such manner that the efforts exerted, in the longitudinal direction, by the elastic return devices, for instance rubber blocks, above referred to, may be directly proportional to the load of the vehicle.

Furthermore, the socket of the ball and socket joint provided at the lower end of the cylinder or tube above referred to is directly connected to the longitudinal members of the truck, which makes it possible to do away with the truck bolster, with the elliptic springs on which this bolster rests, and also with the connecting rods for the suspension of the base that supports these springs.

Finally, the rubber blocks exert their action, which is preferably adjustable, on friction surfaces carried by the external wall of said cylinder or tube.

Preferred embodiments of the present invention will be hereinafter described with reference to the accompanying drawings, given merely by way of example, and in which:

Fig. 1 is a vertical sectional view showing the suspension device interposed between the body of the car and the truck, this sectional view being made on two lines at right angles, that is to say along line $X^a$ $X^b$ $X^c$ of Fig. 2;

Fig. 2 is a plan view, partly in section, corresponding to Fig. 1;

Fig. 3 is a diagrammatical view of a railway truck fitted with the suspension device according to the present invention.

As shown by the drawings, the kingbolt $a$, which is rigid with body $b$, is provided at its end with a spherical part or ball $c$ fitting in a piston $d$ adapted to slide in a cylinder or tube $e$. This cylinder is provided at its lower end with a spherical part or ball $f$ fitting in a socket $g$ rigidly fixed to the transverse member $h$ of the truck.

In order to elastically maintain cylinder $e$ in the vertical position and to brake the longitudinal and transverse displacements thereof, I provide, about cylinder $e$ and at the upper part thereof, rubber blocks $k$, $l$ distributed two by two in the transverse direction and in the longitudinal direction respectively, as shown by Fig. 2. These rubber blocks are held in cup-shaped members $k^1$, $k^2$, and $l^1$, $l^2$ respectively and are compressed by means of screws $m$. The inner cup-shaped members $k^1$ and $l^1$ are arranged to rub against friction plates or surfaces $i$ and $j$ respectively, which are fixed to the four sides of the cylinder or tube $e$.

It will be readily understood that blocks $k$ play the same part as the springs 12 of my prior U. S. patent application above referred to, while blocks $l$ serve to absorb the efforts due to traction or braking of the car which tend to move cylinder $e$ in the longitudinal direction by causing it to pivot about the center of the ball and socket joint $f$, $g$. The longitudinal and transverse displacements of cylinder $e$ are braked by the friction of plates $i$ and $j$ with cup-shaped members $k^1$ and $l^1$. In other words, a transverse shock or thrust is braked by the friction of the plates subjected to the elastic pressure of the rubber blocks that support the longitudinal thrusts (traction and braking), and reciprocally.

The provision of the ball and socket connection $f$, $g$ at the lower end of cylinder $e$ involves the important advantage that the efforts of longitudinal rubber blocks $l$ and of transverse blocks $k$ urging the tube toward its vertical position are directly proportional to the load of the vehicle, which increases the conditions of comfort for the passengers and improves the stability of the railway car on the track, especially when running at high speed. This is due to the fact that, calling $o$ the center of ball $f$, $c^1$ the center of spherical part $c$, $L^1$ the distance between these two centers, and $L^2$ the fixed lever arm of the efforts exerted by rubber blocks $k$ and $l$, the ratio $$\frac{L^2}{L^1}$$

increases with the load of the vehicle, since the spherical part is more and more engaged into cylinder $e$ as this load increases.

In other words, in the case of a car that supports but a small load, spherical part $c$ is located in the upper part of the oscillating cylinder or tube, and consequently close to the rubber blocks, and a relative displacement of the body with respect to the truck will be easier than when the car is fully loaded, that is to say when spherical part $c$, rigidly connected to the body, is located at the bottom of the cylinder or tube, therefore close to the ball and socket joint $f$, $g$ through which said cylinder is connected to the truck, and the outer part, or socket $g$, of which is rigid with said truck.

To sum up, in the case of a car that is but little loaded, the suspension device according to the present invention permits a greater relative displacement of the body with respect to the truck than when the car is fully loaded, in which latter case this displacement, either in the transverse or in the longitudinal direction, may become zero (case of the centre of spherical part $c$ coinciding with the center of the ball and socket joint $f$, $g$).

Of course the respective blocks $k$ and $l$ may be, as illustrated by the accompanying drawings, of unequal thicknesses.

Bellows-shaped casings $p$, $q$ may be provided about kingbolt $a$ and cylinder $e$ for making the whole entirely fluidtight while permitting the relative displacements of the different parts of the mechanism.

The vertical relative displacements of the body with respect to the truck frame $s$, $h$ may be braked, as described in my prior U. S. patent application above referred to, in Fig. 8 of the drawings thereof. A similar arrangement is shown in Fig. 1 of the drawings of this case: Oil, or any other suitable liquid is inclosed in the space $t$ existing between the bottom of the cylinder and the piston $d$ in which spherical part $c$ is fitted, and this piston is provided with conduits $v^1$, $v^2$ with which cooperate suitable valve means such as spring ball valves.

Of course the provision of the ball and socket connection $f$, $g$ at the lower part of cylinder $e$ is not a necessary feature of the present invention and has been illustrated merely as an advantageous, but not limitative, arrangement.

In a likewise manner, the independent and separate blocks of rubber $l$ and $k$ are merely embodiments of elastic means for yieldingly opposing longitudinal and transverse oscillations of cylinder $e$.

In a general manner, while I have described what I deem to be a practical and efficient embodiment of the present invention, it should be well understood that I do not wish to be limited thereto as there might be changes made in the arrangement, disposition, and form of the parts without departing from the principle of the invention as comprehended within the scope of the appended claims.

What I claim is:

1. In a vehicle including a suspended part and an unsuspended part, a suspension device for connecting said suspended part to said unsuspended part, which comprises in combination, a cylinder universally jointed to said unsuspended part, a kingbolt rigid with said suspended part universally and slidably engaging in said cylinder, and means for elastically opposing longitudinal and transverse displacements of said cylinder with respect to said unsuspended part.

2. In a vehicle including a suspended part and an unsuspended part, a suspension device for connecting said suspended part to said unsuspended part, which comprises in combination, a cylinder universally jointed at its lower end to said unsuspended part, a kingbolt rigid with said suspended part universally and slidably engaging in said cylinder, and means interposed between said unsuspended part and the upper end of said cylinder for elastically opposing longitudinal and transverse displacements of said cylinder with respect to said unsuspended part.

3. In a vehicle including a suspended part and an unsuspended part, a suspension device for connecting said suspended part to said unsuspended part, which comprises in combination, a substantially vertical cylinder, a ball and socket joint for connecting the lower end of said cylinder to said unsuspended part, a kingbolt rigid with said suspended part universally and slidably engaging in said cylinder, and rubber blocks interposed between said unsuspended part and the upper end of said cylinder for elastically opposing longitudinal and transverse displacements of said cylinder with respect to said unsuspended part about the center of said ball and socket joint.

4. A suspension device according to claim 3 including at least four rubber blocks, two of which are disposed on a longitudinal diameter of the cylinder and the other two on a transverse diameter of said cylinder.

5. In a vehicle including a suspended part and an unsuspended part, a suspension device for connecting the suspended part to the unsuspended part, which comprises in combination, a substantially vertical cylinder, a ball and socket joint for connecting the lower end of said cylinder to said unsuspended part, a kingbolt rigid with said suspended part universally and slidably engaging in said cylinder, at least four rubber blocks interposed between the upper end of said cylinder and said unsuspended part, two of these blocks being disposed on a longitudinal diameter of said cylinder and the other two on a transverse diameter of said cylinder, whereby longitudinal and transverse displacements of said cylinder with respect to said unsuspended part are elastically opposed, and friction elements interposed between said cylinder and said rubber blocks for braking the longitudinal and transverse displacements of said cylinder with respect to said unsuspended part.

6. In a vehicle including a suspended part and a truck having longitudinal members, a suspension device for connecting said suspended part to said truck, which comprises in combination, a substantially vertical cylinder, a ball and socket joint for connecting the lower end of said cylinder to said truck, the socket of said joint being rigidly fixed to said longitudinal members, a kingbolt rigid with said suspended part universally and slidably engaging in said cylinder, and rubber blocks interposed between said truck and the upper end of said cylinder for elastically opposing longitudinal and transverse displacements of said cylinder with respect to said truck about the center of said ball and socket joint.

JEAN BUGATTI.